(12) United States Patent
Belt et al.

(10) Patent No.: US 6,499,086 B2
(45) Date of Patent: Dec. 24, 2002

(54) PROCESSOR WITH DECOMPRESSED VIDEO BUS

(75) Inventors: Steven L. Belt, Pflugerville, TX (US); Douglas D. Gephardt, Austin, TX (US); Drew J. Dutton, Austin, TX (US); Brett B. Stewart, Austin, TX (US); Rita M. Wisor, Austin, TX (US)

(73) Assignee: Advanced Micro Devices Inc., Sunnyvale, CA (US)

(*) Notice: Subject to any disclaimer, the term of this patent is extended or adjusted under 35 U.S.C. 154(b) by 0 days.

(21) Appl. No.: 09/770,461

(22) Filed: Jan. 29, 2001

(65) Prior Publication Data

US 2001/0004750 A1 Jun. 21, 2001

Related U.S. Application Data

(63) Continuation of application No. 08/994,489, filed on Dec. 19, 1997, now Pat. No. 6,219,754, which is a continuation of application No. 08/487,995, filed on Jun. 7, 1995, now abandoned.

(51) Int. Cl.[7] ............................ G06F 12/00; G06F 13/00
(52) U.S. Cl. ........................ 711/118; 711/100; 710/58; 710/128
(58) Field of Search ................................. 711/100, 118, 711/113, 122; 710/58, 128; 345/144

(56) References Cited

U.S. PATENT DOCUMENTS

| 4,684,997 A | 8/1987 | Romeo et al. ............... 358/263 |
| 5,212,742 A | 5/1993 | Normile et al. .............. 382/166 |
| 5,305,443 A | 4/1994 | Franzo ........................ 710/113 |
| 5,392,407 A | 2/1995 | Heil et al. .................... 710/113 |
| 5,426,739 A | 6/1995 | Lin et al. ..................... 395/325 |
| 5,450,551 A | 9/1995 | Amini et al. ................ 395/299 |
| 5,461,679 A | 10/1995 | Normille et al. ............ 382/304 |
| 5,566,306 A | 10/1996 | Ishida ......................... 395/308 |
| 5,630,078 A | 5/1997 | Fuoco et al. ................. 395/308 |
| 5,721,684 A | 2/1998 | Takita ......................... 701/200 |
| 5,898,894 A | 4/1999 | Gray et al. ................... 710/58 |

*Primary Examiner*—Tuan V. Thai
(74) *Attorney, Agent, or Firm*—Foley & Lardner

(57) ABSTRACT

A dedicated bus between a central processing unit and a peripheral unit, such as a graphics controller driving a video display, provides enhanced capability in an environment in which signal processing occurs within the central processing unit. The dedicated bus relieves other data buses, such as the PCI bus, of the need to communicate large amounts of data, such as decompressed video data. The resulting system supports high bandwidth transmissions of decompressed video data, enabling high resolution 24 bit full motion video and multiple data stream video.

26 Claims, 5 Drawing Sheets

PROCESSOR WITH DECOMPRESSED VIDEO BUS

This application is a Continuation of application Ser. No. 08/994,489, filed Dec. 19, 1997, now U.S. Pat. No. 6,219,754, which in turn is a Continuation of Ser. No. 08/487,995, filed Jun. 7, 1995; now abandoned.

BACKGROUND OF THE INVENTION

1. Field of the Invention

The invention relates generally to processors which include a data bus for communicating large amounts of data, such as video or graphics data, to a device on the bus, such as an external device. In particular, the invention concerns providing a dedicated bus that avoids the need for transmitting such information through other system buses.

2. Related Art

FIG. 1 is a block diagram of a conventional system. A central processing unit (CPU) 1 is connected through a data communication bus 3 to an interface 5 and a high level L2 cache memory 7. L2 cache 7 communicates with another cache 8 over link 11. The L2 cache 7 is connected to a memory control unit 9. Bridge 17 links the system to PCI bus 19. The PCI bus 19 has various elements connected thereto. These could include a double or quad speed CD ROM 21, a graphics controller 23 and possibly a digital signal processor (DSP) 25. Graphics controller 23 is also connected to memory 27 and is used to drive display 29.

In a conventional system as shown in FIG. 1, compressed video is supplied from a video source, such as CD ROM 21, under control of CPU 1, onto PCI bus 19. DSP 25, under control of CPU 1, processes the compressed video to create decompressed video for delivery to graphics control unit 23 for display of a corresponding image on display 29.

Recent advances in video processing have improved the conventional system of FIG. 1 to yield a system as shown in FIG. 2. DSP 25 is no longer connected to PCI bus 19, thus reducing the hardware and real estate needed to implement the system. Instead, digital signal processing is accomplished within CPU 1.

The digital signal processing in CPU 1 can take either of two forms. A first form is the incorporation of a conventional DSP, such as DSP 25, onto the microprocessor chip comprising CPU 1. A second form is the use of processing wherein the activities previously accomplished by a DSP are accomplished by the CPU according to software. In either form, the incorporation of the DSP activities, such as the task of decompressing compressed video to produce decompressed video, into CPU 1, can lead to drawbacks. As described below, these drawbacks are addressed by the invention.

For a conventional display 29 containing 1024 by 768 pixels, production of one high color image requiring 2 bytes per pixel requires about 1.6 megabytes of data. At 8 bits per byte, such an image requires about 12.5 M bits. To produce a full motion video image, a frame rate of 30 frames per second is required. Thus, production of a full motion 16 bit full color video image on display 29 requires about 48 megabytes of data per second.

In the system of FIG. 2, CPU 1 executes the decompression algorithm, and the decompressed video is routed through bridge 17 to PCI bus 19. PCI bus 19 has a peak bandwidth of 133 megabytes, with about 50 megabytes usable. As noted above, a high color image requires 48 megabytes per second of decompressed video. A PCI bus has a peak capability of about 132 M bytes per second. However, this rate is not sustainable because bus overhead reduces the useable bus bandwidth to about 50 M bytes/sec. Since PCI bus 19 has a usable capability of only about 50 megabytes per second, production of decompressed video routed to graphics controller 23 consumes virtually all of the capability of PCI bus 19, thereby leaving little bandwidth for use by other elements such as CD ROM 21 and DSP 25. New 64 bit, 66 MHz PCI bus configurations are faster, but have other drawbacks. Such drawbacks include electromagnetic interference (EMI), increased cost and limits on the number of available slots per bridge, thereby requiring more bridges and further driving costs up.

In the conventional system of FIG. 1, the close physical proximity of DSP 25 to graphics controller 23 minimized the negative impact of the bus dominance by the decompressed video from DSP 25 to graphics controller 23. However, in systems such as that of FIG. 2, wherein the digital signal processing is occurring in CPU 1, this bus dominance leads to degradation of the video image.

For example, since more than two megabytes of bandwidth are needed for CD ROM 21 to provide the compressed video to CPU 1, the result is that 48 megabytes of bandwidth on the PCI bus are not always available for the delivery of decompressed video to graphics controller 23. When the decompressed video is not available to graphics controller 23, one or more video frames may be dropped. When the frame rate falls below 30 frames per second, the resulting video image may appear degraded. To compensate for this situation, designers have opted to use only a portion of video display 29, such as a window, to show full motion video. By using less (fewer pixels) of the display, a smaller bandwidth is required for the decompressed video, the frame rate can be maintained, and sufficient bus capacity exists to allow other devices to communicate via PCI bus 19. However, the constraint of using only a portion of the available display for full motion video is limiting.

SUMMARY AND OBJECTS OF THE INVENTION

In view of the above limitations of the related art, it is an object of the invention to provide a system in which decompressed video can be transmitted to a display with a minimum of frame dropping and without incurring the disadvantages of conventional systems.

The above and other objects of the invention are accomplished by providing a separate bus from CPU 1 to graphics controller 23 over which decompressed video is transmitted. This separate bus eliminates communication through L2 cache 7, the memory control unit 9, bridge 17, and PCI bus 19. Implementation of a separate bus communicating between CPU 1 and graphics controller 23 according to the invention relieves the PCI bus of this communication requirement, thus providing additional PCI bus capability to facilitate communication between other elements of the system. Although the capability of PCI bus 19 is itself unaffected, the elimination of the decompressed video from PCI bus 19 results in more bandwidth being available for the other elements to communicate over this bus.

The high speed bus according to the invention can be a duplicate of the buses currently being used.

Preferably, however, the bus between the CPU 1 and the graphics controller 23 would be a serial high speed bus which would provide high bandwidth and low electro magnetic interference (EMI).

BRIEF DESCRIPTION OF THE DRAWINGS

The above and other objects of the invention will be apparent from the following description in conjunction with the drawings in which.

DETAILED DESCRIPTION OF THE INVENTION

Figure 3:
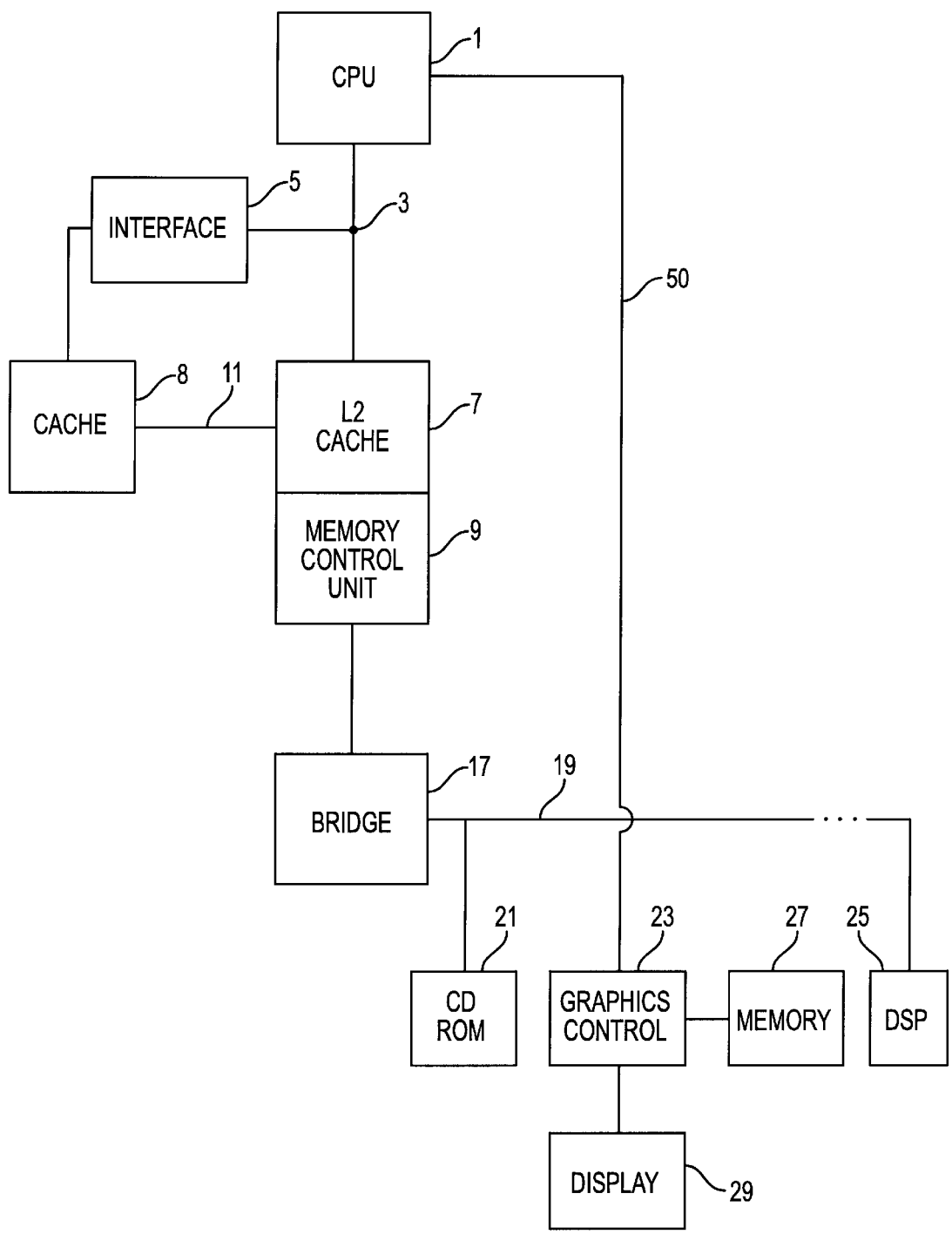
FIG. 3 illustrates a system according to the invention.

FIG. 3 illustrates a system according to the invention which incorporates a separate bus 50 between CPU 1 and graphics controller 23. As discussed previously herein, a conventional PCI bus has a usable bandwidth of about 50 megabytes and therefore could accommodate conventional decompressed video at 30 frames per second, or 48 megabytes per second to provide 16 bit full color full motion video to all of the pixels of a conventional display. However, this data flow could completely utilize the bus and may not even provide the data transfer capability needed to create an enhanced image.

Preferably, a high speed bus would be used to construct separate bus 50. For example, a 32 bit: 33 MHz bus would permit 132 MB/sec. Alternatively, a narrow (8 bit) 66 MHz bus would also be useable. Other bus structures which provide point to point or multipoint buses may also be used. Point to point buses may be preferred for their simple connection and control while obtaining desired performance improvements. For example, implementing such a separate speed bus according to the invention would allow upgrading a system from displaying 16 bit high color images to displaying 24 bit full color images, thereby providing additional colors and approaching photographic quality. In addition, resolution could be increased from that of conventional systems to, for example, a display having 1280 by 1024 pixels.

The system according to the invention would also be useful for bit block transfers (BLIT) in video graphics acceleration. Indeed, any interaction from the main memory to the video memory or back (bidirectional) could be accomplished over high speed bus 50. Further a system according to the invention is not limited to transferring video or graphic data over the separate bus or back channel, since implementing a separate back channel or bus according to the invention can be applied to communications between any devices requiring high speed transfer of large amounts of data.

Figure 1:
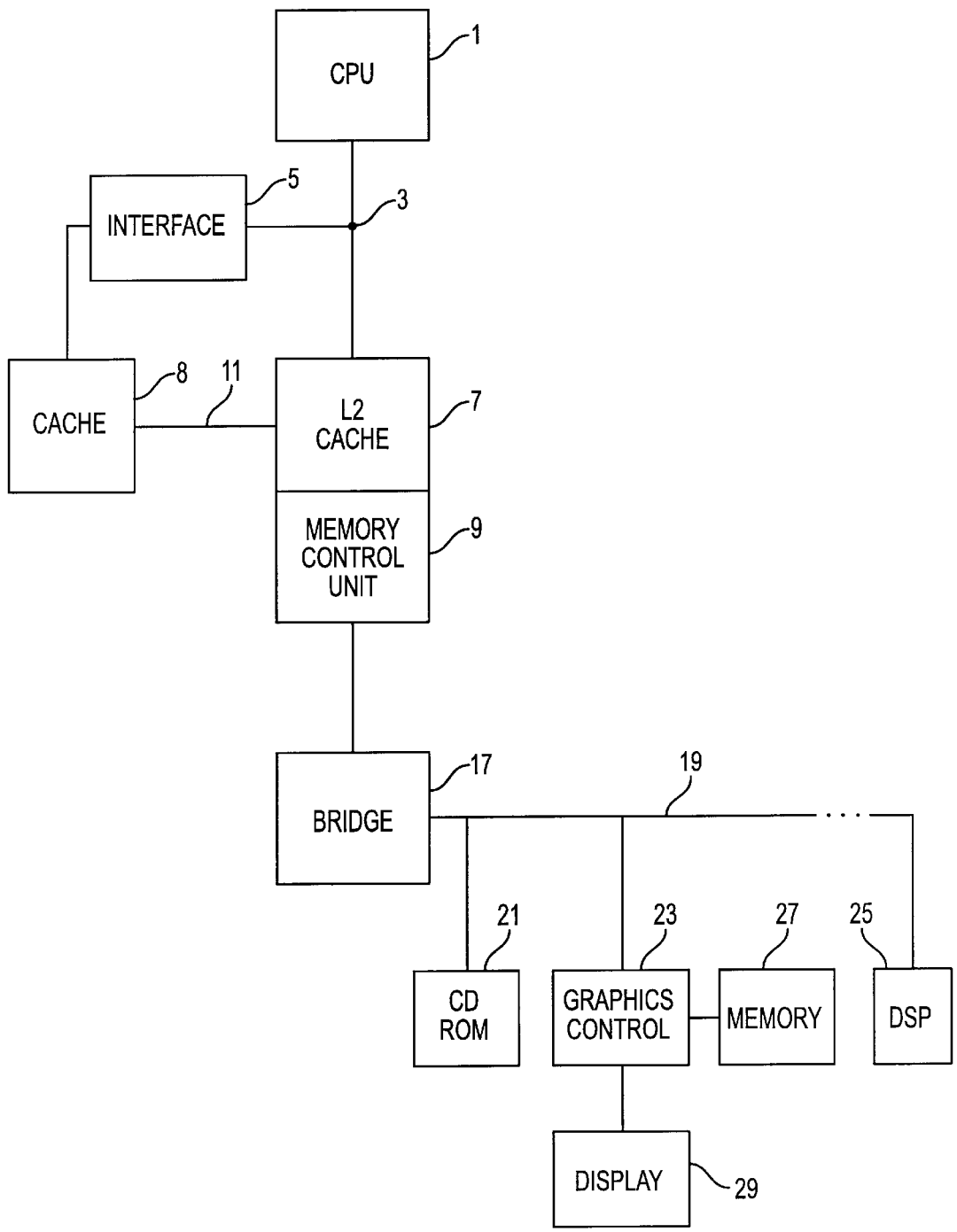
FIG. 1 illustrates a conventional architecture.
Figure 2:
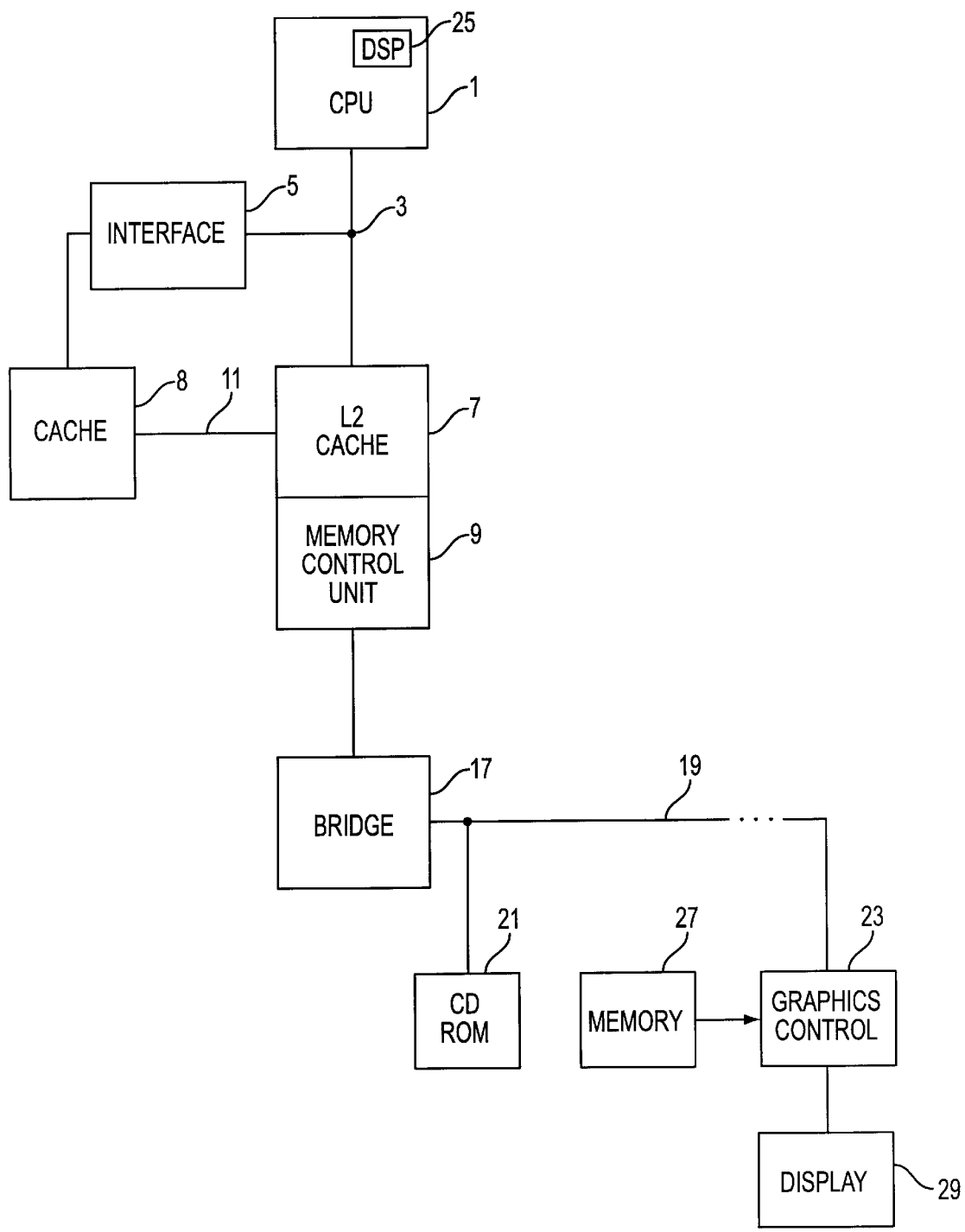
FIG. 2 illustrates an alternative conventional architecture, with the DSP functions located in the CPU.

Performance differences in accomplishing animation on a display screen between the conventional apparatus and one implemented according to the invention are illustrative of the benefits that can be achieved. Referring to FIG. 2, typically, a frame n is being displayed on display 29, while the next frame n+1 is being generated and stored by the CPU 1. The process repeats such that frame n+1 is generated and sent to the graphics controller 23 in the same manner as that of frame n, through the L2 cache 7, bridge 17, and PCI bus In accordance with the invention, decompressed as shown in FIG. 3, video from CPU 1 would be transmitted over separate bus 50, thereby avoiding communication bottlenecks on PCI bus 19 and the additional communication through L2 cache 7 and bridge 17. The use of bus 50 eliminates the constraints placed on the system by the limitations of PCI bus 19. Thus, display capabilities are limited only by the speed of the CPU 1 and its ability to retrieve data from the memory, and the capacities of bus 50 and graphics controller 23.

A system according to the invention can therefore facilitate the use of one video monitor to display multiple video images. Such a benefit can be useful, for example, in video conferencing where multiple streams of video data are being produced and transmitted. Also, since the use of larger screens with more resolution is possible, a system according to the invention can be useful in games, education and entertainment.

Moreover, certain games can benefit from the ability to use multiple streams of video data. Further, batch mode communications and communications in which video, rather than text, is used to produce annotations, can be greatly enhanced by a system according to the invention.

Figure 4:
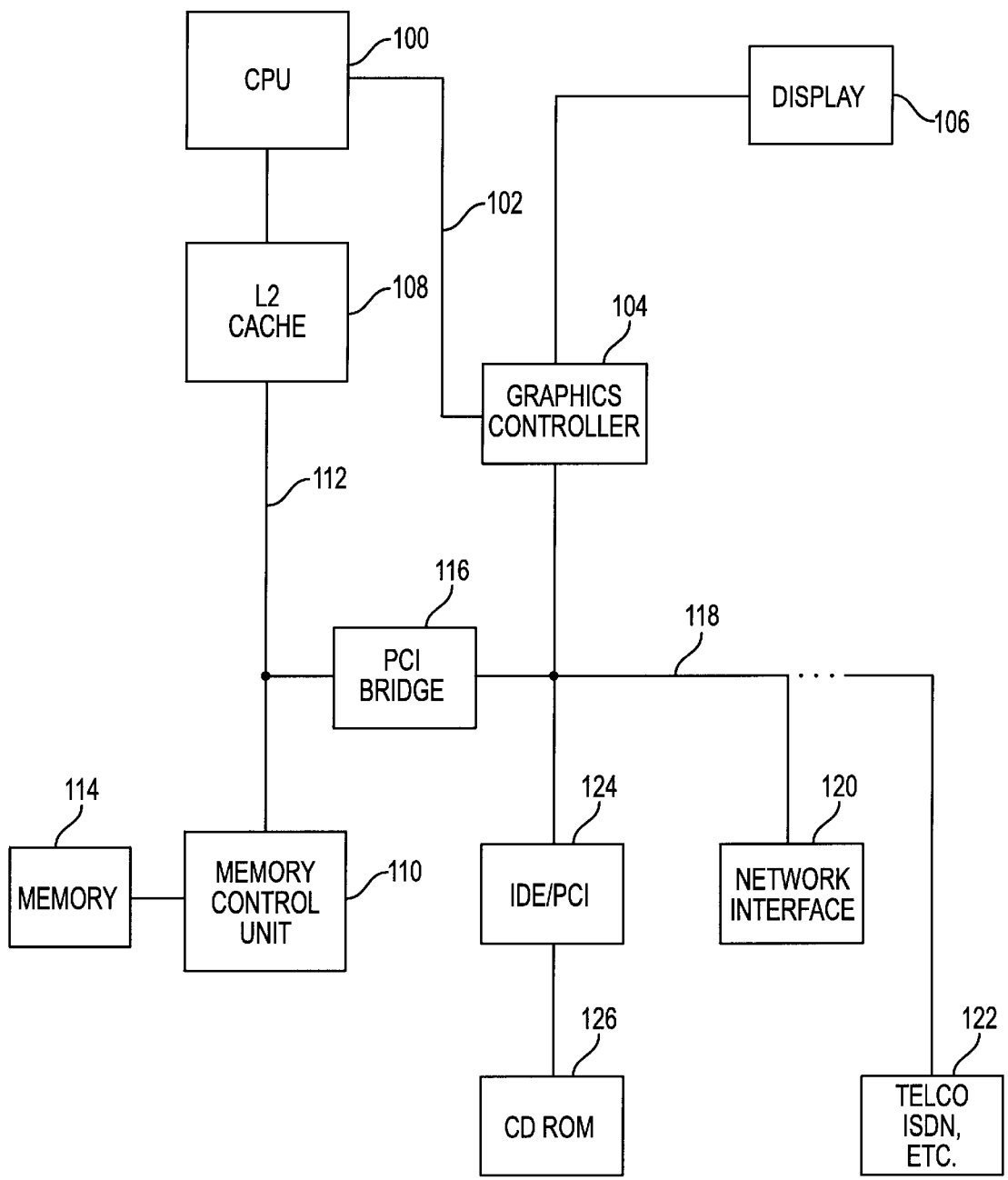
FIG. 4 illustrates another system configuration according to the invention.

FIG. 4 illustrates another configuration of a system according to the invention. In this configuration, central processing unit 100 transmits information over a high speed back channel 102 to another device 104. By way of example and not limitation, FIG. 4 illustrates CPU 100 transmitting data to a graphics controller 104. In such an example, high speed back channel 102 would carry uncompressed intensity and color component data (Y,U,V) which is a decorrelated version of red, green, blue (RGB) data for a pixel. Graphics controller 104 would perform color conversion and scaling and transmit its output to display 106. CPU 100 operates under program control through the L2 cache 108 which is connected to memory control unit 110 through line 112. Memory control unit 110 accesses memory 114. PCI bridge 116 is shown connected between line 112 and PCI bus 118.

Various elements are shown connected to the PCI bus 118. These include network interface 120, a telephone line, integrated services digital network (ISDN) or other telecommunications interface 122, and a IDE/PCI interface 124. This interface may also be connected to the graphics controller 104 and to a CDROM 126.

The advantage to the configuration according to the invention as shown in FIG. 4 is that high density information transfers on the dedicated back channel 102 to device 104 are accomplished without diverting resources from PCI bus 118. The technique can be applied to any device 104 requiring large amounts of data. In the example shown in FIG. 4, the decompressed video out of the CPU 100, which is transferred on high speed back channel 102 to graphics controller 104, would overwhelm PCI bus 118 if PCI bus 118 were used for that purpose. As previously discussed, by diverting this data transfer need from the PCI bus 118, the PCI bus 118 is available to perform other tasks.

Figure 5:
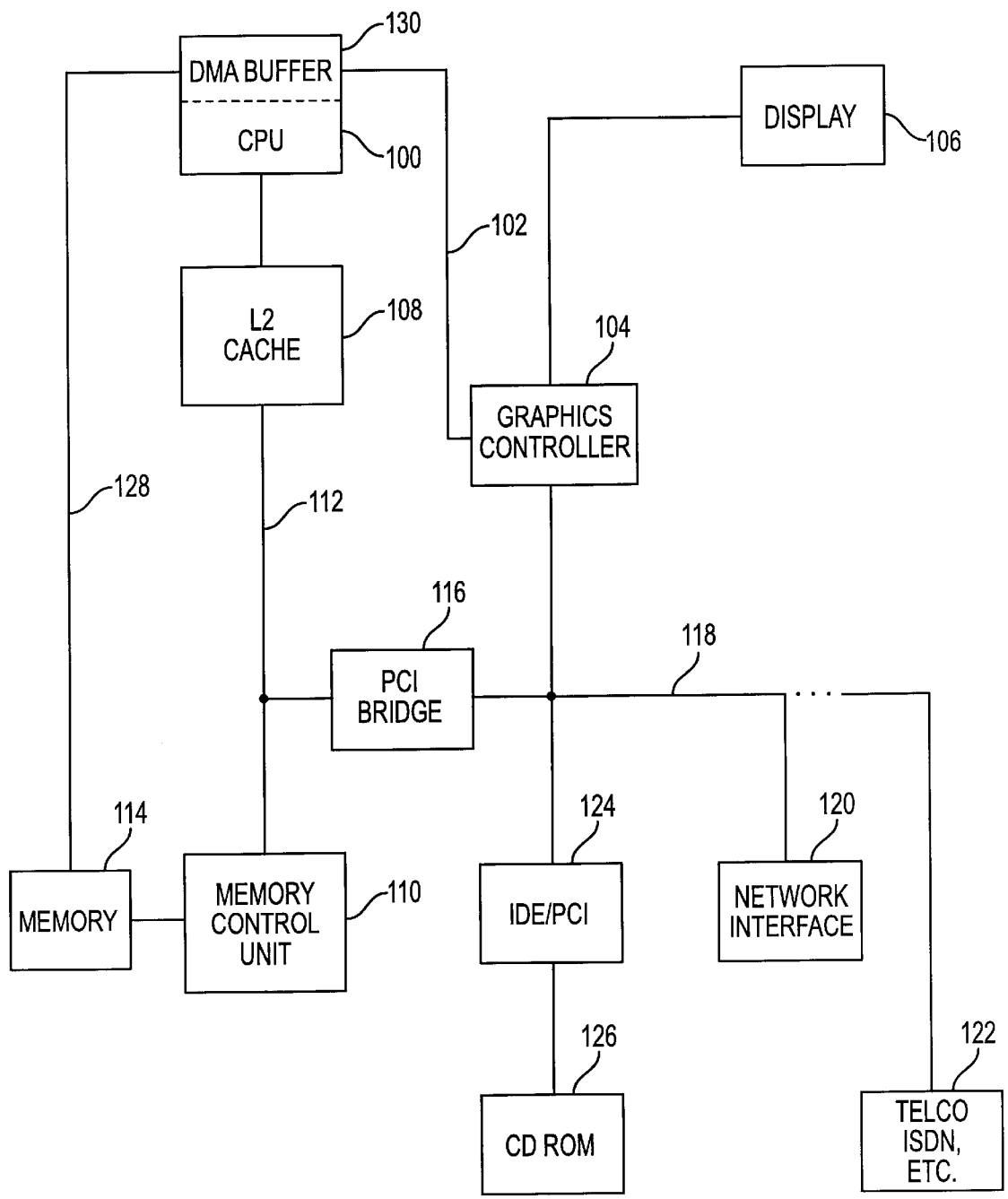
FIG. 5 illustrates a system according to the invention which is implemented with a direct memory access (DMA) buffer.

As shown in FIG. 4, CPU 100 operates under program control, for example using a write frame buffer memory command, which requires routing information from memory 114 through L2 cache 108. Another configuration according to the invention, as shown in FIG. 5, can further improve performance by eliminating the need to access data to be transferred on the high speed back channel 102 through the cache 108. FIG. 5 shows a direct memory access (DMA) path 128 between a video frame (DMA) buffer 130 and memory 114. Using this direct path, data can be transferred as a background task from memory 114 through a DMA-like buffer 130 to a device such as graphics controller 104.

A system according to the invention can be constructed with multiple high speed path back channels which can be tailored for different types of devices with high data transmission requirements. For example, a high speed back channel bus 102 can be constructed to accommodate a graphics subsystem with a private video graphics interface channel, with the interface customized to the user's requirements.

It should further be noted that the system according to the invention can be used to transmit any type of high speed data, such as video or graphics information. For example, in graphics applications, the high speed bus 50 or high speed back channel 102 can be used for bit block transfers (BLIT) used in video graphics acceleration for generating sprites or three dimensional graphics.

It is also possible with the invention to establish a bi-directional high speed bus 50 or bidirectional high speed back channel 102 in order to implement data stream read buffers. According to the invention, frame by frame rendering in which a frame is built entirely in main memory and copied to the video frame buffer is also possible. For example, in FIG. 5 the frame would be built in memory 114 and copied to the buffer 130 for transmission over high speed back channel 102 to graphics controller 104.

An important consideration in the system according to the invention is determining when a CPU will access the high speed bus 50 (FIG. 3) or high speed back channel 102 (FIGS. 4 and 5), rather than perform conventional processing over the PCI bus 19 (FIG. 3) or 118 (FIGS. 4 and 5). Several options are available according to the invention. The first option entails the use of a separate, dedicated engine in the CPU 100 to access high speed back channel 102 as a dedicated streaming bus. The dedicated engine would perform predetermined tasks and always direct its communications over bus 102. Separate such engines could be provided in systems where it is desirable to implement a plurality of such buses.

Alternatively, CPU 100 could recognize a range of memory addresses which, when accessed, trigger the CPU to communicate over the high speed bus. According to the invention, a system could be implemented to dynamically allocate the memory ranges which would trigger access to the high speed bus based on memory needs and the information stored therein.

A third option is to provide an instruction, or a field in an instruction, which identifies the bus that will be used. The field could be as simple as a single bit used as an override operator to trigger use of the high speed bus. Other field arrangements could also be selected. The use of an instruction or a field in an instruction would allow the programmer or other user to select which bus will be used for certain types of communication. In addition, different instructions or fields could be used to access different dedicated back channel buses in systems where it is desirable to implement a plurality of such buses according to the invention.

It would also be possible to configure the system to elect the high speed back channel bus when specific devices are being accessed or when a slower speed bus becomes occupied with predetermined amounts of communication.

Finally, as illustrated in FIG. 5, a direct memory access mode could be employed in which data transfer takes place directly from memory 114 to a DMA-like buffer 130, for example as a background task.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A data processing system comprising:
   a central processing unit;
   a memory;
   a first bus having a plurality of devices communicatively connected thereto to provide information to each other and to said central processing unit; and
   a graphics controller and a second bus, said second bus providing point-to-point connection for dedicated communication between said central processing unit and said graphics controller,
   wherein said graphics controller is not connected to said first bus and said second bus is exclusively dedicated to data transfer between said graphics controller and said central processing unit,
   wherein said central processing unit receives compressed video data from at least one of said plurality of devices over the first bus, and said central processing unit decompresses the compressed video data and outputs the decompressed video data over the second bus to said graphics controller for output on a display, and
   wherein the data transfer of the decompressed video data between said graphics controller and said central processing unit is only through the second bus and not through any part of the first bus.

2. The apparatus recited in claim 1, wherein said central processing unit controls access to said second bus.

3. The apparatus recited in claim 2, wherein said central processing unit stores a program to recognize address ranges in said memory and provide information to said second bus when said address ranges are accessed.

4. The apparatus recited in claim 3, wherein said address ranges are stored as predetermined ranges.

5. The apparatus recited in claim 3, wherein said address ranges are stored as dynamically allocated ranges.

6. The apparatus recited in claim 5, wherein said dynamically allocated ranges are determined by system requirements.

7. The apparatus recited in claim 2, wherein said central processing unit is responsive to a field of an instruction to elect one of said first bus and said second bus.

8. The apparatus recited in claim 2, further comprising a direct memory access buffer.

9. The apparatus recited in claim 8, wherein said direct memory access buffer is responsive to commands from said CPU to transfer data from said memory to said second bus.

10. The apparatus recited in claim 2, wherein said central processing unit comprises a dedicated CPU engine responsive to predetermined commands to access said second bus.

11. The apparatus recited in claim 1, wherein said second bus provides bit block transfers between said peripheral device and said central processing unit.

12. The apparatus recited in claim 1, comprising a video frame buffer, said video frame buffer receiving a video frame built in said memory and transmitting said video frame to said second bus.

13. An apparatus as recited in claim 1, wherein said second bus is a bi-directional bus.

14. An apparatus as recited in claim 13, wherein said second bus comprises a data streaming bus.

15. An apparatus as recited in claim 1, wherein said second bus is linked to a custom interface for said peripheral unit.

16. A method of processing data, comprising the steps of:

receiving compressed video data in a central processing unit via a PCI bus;

decompressing the compressed video data in the central processing unit to produce decompressed video data; and supplying the decompressed video data from the central processing unit to a graphics controller via a second, dedicated bus, said dedicated bus being exclusively dedicated to data transfer between said graphics controller and said central processing unit, wherein the data transfer of the decompressed video data between said graphics controller and said central processing unit is only through the second bus and not through any part of the first bus.

17. The method recited in claim 16, further comprising the step of displaying, on a display, video images corresponding to the decompressed video data.

18. The method recited in claim 16, wherein said central processing unit controls access to said second bus.

19. The method recited in claim 16, wherein said central processing unit stores a program to recognize address ranges in a memory and provide information to said second bus when said address ranges are accessed.

20. The method recited in claim 19, wherein said address ranges are stored as predetermined ranges.

21. The method recited in claim 19, wherein said address ranges are stored as dynamically allocated ranges.

22. The method recited in claim 21, wherein said dynamically allocated ranges are determined by system requirements.

23. The method recited in claim 16, wherein said central processing unit is responsive to a field of an instruction to elect one of said first bus and said second bus.

24. The method recited in claim 16, wherein a direct memory access buffer is responsive to commands from said CPU to transfer data from said memory to said second bus.

25. The method recited in claim 16, wherein said central processing unit comprises a dedicated CPU engine responsive to predetermined commands to access said second bus.

26. A data processing apparatus, comprising:

a central processing unit receiving compressed video data from a video source via a first bus and producing decompressed video data therefrom;

a graphics controller receiving the decompressed video data from the central processing unit via a second bus, said second bus being different from said first bus and being exclusively dedicated to data transfer between said graphics controller and said central processing unit;

a memory coupled to said first bus, said memory storing video data;

a direct memory access (DMA) buffer that is part of said central processing unit; and a third bus that directly couples said memory to said DMA buffer in which no other devices are directly coupled to said third bus, wherein compressed video data is sent from said memory to said DMA buffer over said third bus, and wherein said central processing unit processes said compressed video data sent over said third bus as a background task while a primary task is being performed by said central processing unit, the background task corresponding to decompressing the compressed video data received over said third bus and outputting the decompressed video data on said second bus to said graphics controller.

* * * * *